(12) United States Patent
Toda et al.

(10) Patent No.: US 6,450,673 B1
(45) Date of Patent: Sep. 17, 2002

(54) VEHICLE HEAD LAMP AUTO-LEVELING SYSTEM

(75) Inventors: Atsushi Toda; Hideaki Takeuchi, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/879,588

(22) Filed: Jun. 12, 2001

(30) Foreign Application Priority Data

Jun. 15, 2000 (JP) .................................... 2000-180187

(51) Int. Cl.[7] ........................... F21V 21/28; F21V 21/29
(52) U.S. Cl. .................. 362/465; 362/464; 362/466; 362/467
(58) Field of Search ................. 362/464, 465, 362/466, 467, 525, 526

(56) References Cited

U.S. PATENT DOCUMENTS

| | | | | |
|---|---|---|---|---|
| 5,877,680 A | * | 3/1999 | Okuchi et al. | 340/468 |
| 5,907,196 A | | 5/1999 | Hayami et al. | |
| 6,109,759 A | * | 8/2000 | Tanabe et al. | 362/42 |
| 6,193,398 B1 | * | 2/2001 | Okuchi et al. | 362/446 |

FOREIGN PATENT DOCUMENTS

| | | |
|---|---|---|
| GB | 2 309 773 A | 8/1997 |
| GB | 2 253 757 A | 12/1998 |
| GB | 2 340 925 A | 3/2000 |
| GB | 2 341 671 A | 3/2000 |
| GB | 2 342 149 A | 4/2000 |
| GB | 2 346 436 A | 8/2000 |
| JP | 2000-085458 | 3/2000 |

* cited by examiner

*Primary Examiner*—Sandra O'Shea
*Assistant Examiner*—Jacob Y. Choi
(74) *Attorney, Agent, or Firm*—Fish & Richardson P.C.

(57) ABSTRACT

A head lamp auto-leveling system can be used inexpensively and for a long term by reducing the frequency in the drive of actuators, and which does not arouse an unpleasant feeling in the driver. An implementation of the auto-leveling system includes head lamps whose optical axis L is tilted vertically with respect to a vehicle body by a drive of an actuator 10, a control portion 16 for controlling the drive of actuators 10, a speed sensor 12, a height sensor 14, and a memory portion 20 for storing pitch angle data detected by the height sensor 14. The control portion 16 controls the actuators 10 based on the detected pitch angle data such that optical axes L are brought into a predetermined tilted state with respect to a road surface. The control portion 16 also decides a stable vehicle posture to control (level) the drive of the actuators 10 during both stop and running states if the difference between a plurality of moving average pitch angle data (e.g., 1-second average and 3-second average) exceeds a reference value θa once, and then a state below the reference value θa is continued for a predetermined time.

6 Claims, 10 Drawing Sheets

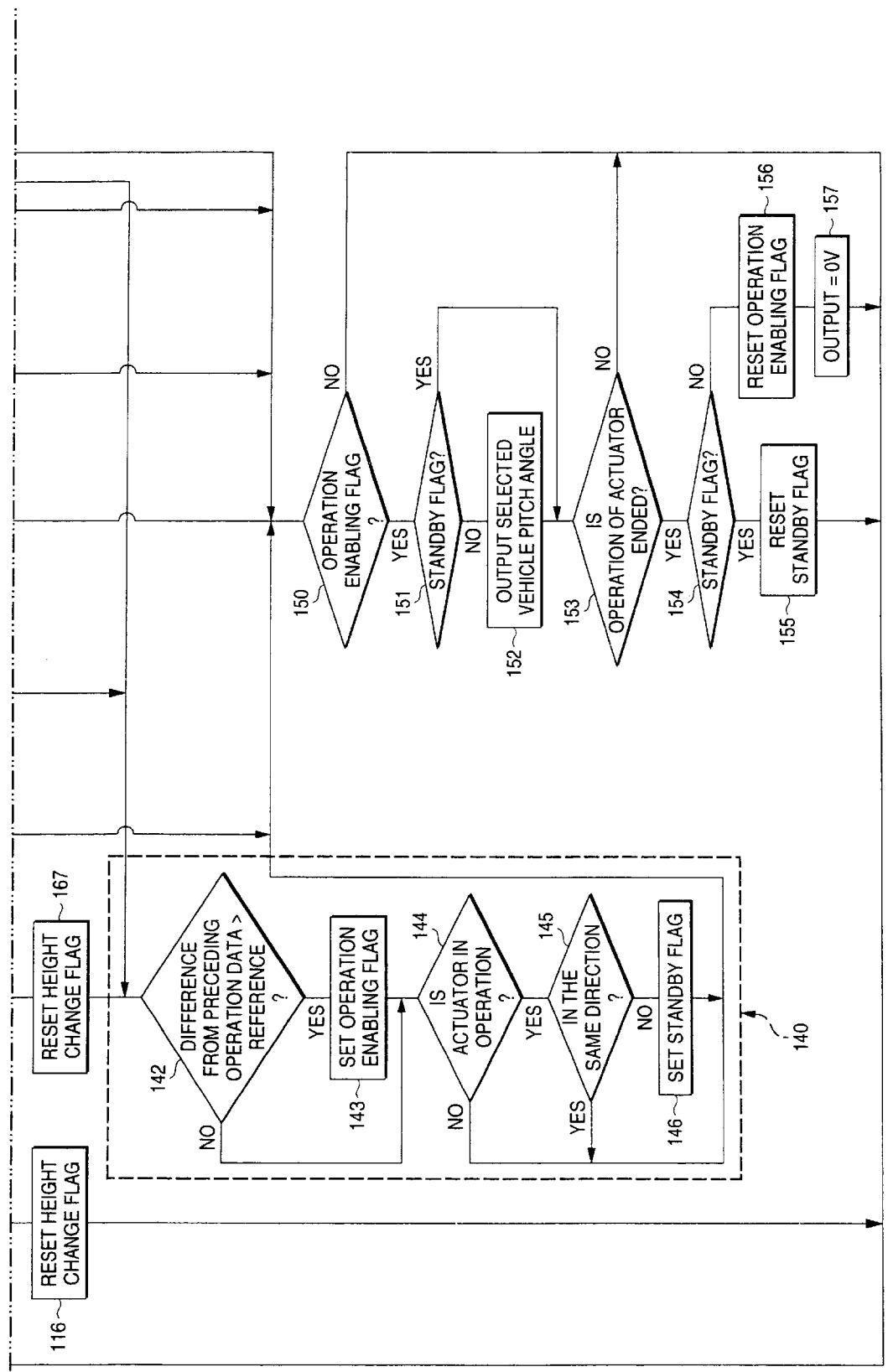

US 6,450,673 B1

VEHICLE HEAD LAMP AUTO-LEVELING SYSTEM

BACKGROUND OF THE INVENTION

The present invention relates to a car head lamp auto-leveling system. The system automatically adjusts a tilt of an optical axis of a head lamp based on an inclination in the longitudinal direction of the vehicle (referred to as a "pitch angle" hereinafter) in the direction to cancel a corresponding variation in the pitch angle. More particularly, the auto-leveling system automatically adjusts the optical axis of the head lamp mainly based on the pitch angle of the standing vehicle.

The head lamp of this type has such a structure, for example, that the reflector into which the light source is inserted is fixed to the lamp body to be tilted from the horizontal tilting axis and also the optical axis of the reflector (head lamp) can be tilted from the horizontal tilting axis by the actuator.

The auto-leveling system in the prior art is constructed by providing a pitch angle detecting means, a speed sensor, a control portion for controlling the drive of the actuator based on detection signals supplied from them and the like, to the vehicle, and adjusts the head lamp such that the optical axis of the head lamp (reflector) is always set to a predetermined state to a road surface. 1However, conventional auto-leveling systems are constructed to execute the leveling in real time in response to the change in the vehicle posture due to the acceleration/deceleration during the running and the load change, such as loading/unloading of the baggage during the stop state, having people get in and out of the vehicle, and the like, regardless of the running and the stopped state of the vehicle. Therefore, the actuator is operated very frequently which increases the consumption of power, and also great durability is required of the constituent parts of the driving mechanism such as the motor, the gears, etc. which causes an increase in cost.

Therefore, for the purpose of providing the auto- leveling system that can be used inexpensively for the long term by reducing the frequency in the drive of an actuator, an auto-leveling system was proposed which controls the drive of the actuator at a predetermined interval (e.g., 10 second interval) during the stop state, and controls the drive of the actuator only once in running as far as the vehicle is in a stable running state (Patent Application Publication (KOKAI) 2000-85458). Since a plurality of changes in the posture of the vehicle during a stop can be collected in one drive control of the actuator, the durability of the actuator can be improved.

However, according to the above proposed auto- leveling system, even if the vehicle posture is changed immediately after the drive of the actuator (immediately after the leveling), the next drive of the actuator (leveling) is performed after 10 seconds lapsed and thus the driver feels the delay. Thus, since there is no relevancy between the timing at which the vehicle posture is changed by people getting in and out of the vehicle, the loading/unloading of the baggage, etc. and the timing at which the actuator is operated (10 second interval), such leveling arouses a peculiar feeling in the driver.

Also, the pitch angle data used in the drive control of the actuator are the average pitch angle data in the moving time of 1 second (1-second average pitch angle data), for example. Therefore, if the vehicle posture is changed very rarely in the middle of 1-second average, first the actuator is operated once by the 1-second average pitch angle data, on which the change up to the middle is reflected, and then the actuator is operated after 10 seconds by the 1-second average pitch angle data, on which the all changes of the vehicle posture are reflected, whereby the optical axis correction is completed. In this case, the actuator is operated (the leveling is executed) twice for one change in the vehicle posture, which leads to the reduction in the durability lifetime of the actuator.

SUMMARY OF THE INVENTION

The present invention has been made in light of the above problems in the prior art, and provides a car head lamp auto-leveling system which can be used inexpensively for a long term by reducing the frequency of the drive of actuators, and which does not arouse an unpleasant feeling in the driver.

A car head lamp auto-leveling system according to the invention includes head lamps whose optical axis are tilted vertically relative to a vehicle body by a drive of an actuator; a controlling means for controlling the drive of the actuators; a speed sensing means for sensing a speed of a vehicle; a pitch angle detecting means provided to at least one of left and right sides of at least one of a front wheel suspension and a rear wheel suspension, for detecting a pitch angle of the vehicle; and a memory portion for storing pitch angle data of the vehicle detected by the pitch angle detecting means; wherein the controlling means calculates moving average pitch angle data during a predetermined moving time based on the pitch angle detected by the pitch angle detecting means and then stores the data in the memory portion, and also controls the drive of the actuators based on the moving average pitch angle data such that optical axes of the head lamps are always brought into a predetermined tilted state with respect to a road surface when the vehicle is stopped or when moving, and wherein the controlling means calculates the moving average pitch angle data during a plurality of different moving times based on the pitch angles detected by the pitch angle detecting means, respectively, and then stores the pitch angle data in the memory portion, discriminates stopped and moving states of the vehicle based on an output of the speed sensing means, controls the drive of the actuators in the stopped state based on the moving average pitch angle data during a stable vehicle posture wherein the stable vehicle posture is a state below a reference value that continues for at least a predetermined time and is maintained after the difference between respective moving average pitch angle data collected during a plurality of different moving times is increased once to exceed the reference value, and controls the drive of the actuators in the running state based on the moving average pitch angle data collected during a stable vehicle moving state wherein the stable vehicle moving state is a state which has a speed of more than a predetermined value and an acceleration of less than a second predetermined value and which moving state is continued and is maintained for a predetermined time.

In another implementation, a car head lamp auto-leveling system according to the invention includes head lamps whose optical axis are tilted vertically relative to a vehicle body by a drive of an actuator; a controlling means for controlling the drive of the actuators; a pitch angle detecting means provided to at least one of left and right sides of at least one of a front wheel suspension and a rear wheel suspension, for detecting a pitch angle of the vehicle; and a memory portion for storing pitch angle data of the vehicle detected by the pitch angle detecting means; wherein the controlling means calculates moving average pitch angle data during a predetermined moving time based on the pitch angle detected by the pitch angle detecting means and then stores the data in the memory portion, and also controls the drive of the actuators based on the moving average pitch angle data such that optical axes of the head lamps are always brought into a predetermined tilted state with respect to a road surface when the vehicle is stopped or when moving, and wherein the controlling means calculates the moving average pitch angle data during a plurality of different moving times based on the pitch angles detected by the pitch angle detecting means, respectively, and then stores the pitch angle data in the memory portion, and controls the drive of the actuators in both stop and running states of the vehicle based on the moving average pitch angle data collected during a stable vehicle posture wherein the stable vehicle posture is that state wherein the moving average pitch angle is below a reference value and continues for at least a predetermined time and is maintained after the difference between the respective moving average pitch angle data during a plurality of different moving times is increased once to exceed the reference value.

The present invention is concerned with the leveling of a head lamp (optical axis correction) based on the pitch angle data of the vehicle in the stopped state. The pitch angle data collected during the stopped state of the vehicle are more precise than the pitch angle data collected during the moving state of the vehicle since they are less affected by disturbance factors at the time of detection. Since the drive of the actuators is controlled based on this precise pitch angle data, the precise auto-leveling can be carried out correspondingly.

Then, the control of the drive of the actuators in the stopped state of the vehicle is limited when the vehicle posture is stabilized after such vehicle posture is changed once, so that the frequency of operation of the actuators is small. Thus, the consumption of power can be conserved and the abrasion of the constituent members of the driving mechanism can be reduced. Also, since the actuators are operated (leveled) inasmuch as the changed vehicle posture has been stabilized, the disadvantage in the prior art is overcome because the actuators are not operated (leveled) twice for one change in the vehicle posture. In addition, since the actuators are operated (leveled) immediately when the changed vehicle posture is stabilized, a delayed operation feeling of the prior art is not aroused and also the driver senses no strange feeling.

Also, the leveling operation (optical axis correction) during the running state is limited to only during running, wherein the stable moving state has a speed of more than a predetermined value and has an acceleration of less than a second predetermined value and that continues for a predetermined time. In addition, the leveling (optical axis correction) that is performed based on the pitch angle data detected during an improper stop state of the vehicle, like the case where the vehicle is stopped on a sloping road, or the case where the vehicle is stopped but has ridden up on a sidewalk, or the like, can be corrected properly by the leveling (optical axis correction) that is performed based on the moving average pitch angle data (the data that are close to the pitch angle data collected in the stop of the vehicle) in this stable moving state.

In another implementation, the leveling (optical axis correction) during the running state is limited to only in the stable vehicle posture in which the vehicle posture is stabilized after such vehicle posture is changed, like the drive control (leveling) of the actuators during the stopped state of the vehicle. In addition, the leveling (optical axis correction) that is performed based on the pitch angle data detected during an improper stop state of the vehicle, like the case where the vehicle is stopped on a sloping road, or the case where the vehicle is stopped and has ridden up on the sidewalk, or the like, can be corrected properly by the leveling (optical axis correction) that is performed based on the moving average pitch angle data during this stable vehicle posture.

Also, if the predetermined stable running conditions are satisfied during the running state (during the stable running stage the state has a speed of more than a predetermined value and an acceleration of less than a second predetermined value that continues for a predetermined time), the drive control (leveling) of the actuators is executed. However, even if the predetermined stable running state conditions are satisfied during movement, sometimes the proper pitch angle data cannot be detected, like in the case of the vehicle turning, or slalom running, or movement on a rough road, etc. In other words, since the influence of turning forces and the influence of the unevenness of the road surface appears on the detected pitch angle data when the vehicle is turning, the slalom running, and the heavily rough road running, the pitch angle data that are clearly different from those in the stable running state such as the running in which no turning force is applied, the running on the smooth surface, etc. are detected. Thus, since the stable running conditions are satisfied in these running states which are normally rejected as the unstable running state, there is such a possibility that the leveling (optical axis correction) is performed based on the improper pitch angle data.

Therefore, since the drive control of the actuator (leveling) is executed only during the running state if the similar conditions to those in the stopped state of the vehicle (the state below the reference value is continued for the predetermined time after the difference between the moving average pitch angle data exceeds the reference value) are satisfied, the improper auto-leveling can be avoided without fail.

A feature of the car head lamp auto-leveling system according to the invention may be that a first drive control of the actuators by the controlling means which decides the stable vehicle posture when the difference between the plural moving average pitch angle data is smaller than the reference value continues at least for a predetermined time in disregard of a condition that the difference between the plural moving average pitch angle data in different moving times is increased once to exceed the reference value, and then controls the drive of the actuators based on the moving average pitch angle data collected during a stable vehicle posture state when the difference between the moving average pitch angle data in the stable vehicle posture and the pitch angle data used in preceding drive control of the actuators exceeds a predetermined value.

A characteristic of the vehicle suspension is that sometimes the suspension is not expanded and contracted when the static load applied to the vehicle during a stopped state is small. In this case, normally the change in the vehicle posture can be detected since the difference between the moving average pitch angle data exceeds the reference value because of people getting on and off during a stop. Nevertheless, a situation in which the change in the vehicle posture cannot be detected occurs since the suspension is not changed. Then, the suspension is restored to the stroke equivalent to the static load after the expansion and contraction of the suspension is repeated by the running of the vehicle, and as a result the vehicle posture is changed. But the vehicle posture is not changed (varied) during the stopped state after the running state but is changed during the running state. Accordingly, there is no situation to clear the condition that the difference between the moving average pitch angle data exceeds the reference value unless the new change of the vehicle posture is caused after the stop in which the vehicle posture is in the stable state. Thus, although the vehicle posture is changed in response to the small static load applied prior to movement, such change of the vehicle posture cannot be detected and thus there is the possibility that the leveling is not carried out. For this reason, in the case that the drive control of the actuator should be executed for the first time after the stop of the vehicle, the drive control of the actuator is executed to adjust the optical axis with regard to the above characteristic of the suspension if the deviation of the optical axis is detected, even in the situation that the difference between the moving average pitch angle data does not exceed the reference value (the change of the vehicle posture cannot be detected), whereby the irrationality due to the characteristic of the suspension can be overcome.

Also, the deviation of the optical axis is decided based on the difference between the pitch angle data at this time and the pitch angle data used in the preceding drive control of the actuator that exceeds a predetermined value. In this case, if the drive control of the actuator is executed as far as such difference exceeds the reference value that is more than the pitch angle equivalent to the hysteresis width of the actuator driving circuits of the right and left head lamps, the problem wherein only one head lamp is leveled can be avoided.

In this case, the pitch angle data used in the drive control of the actuators that is performed for the first time after the stop of the vehicle can also be utilized as the preceding control data, which is compared to detect the deviation of the optical axis in the drive control of the actuators that is performed thereafter in the vehicle stopped state.

Another feature of the car head lamp auto-leveling system may be that, in case a new vehicle posture stable state occurs, which is a state below the reference value that continues for at least a predetermined time and is brought about during operation of the actuators after the difference between a plurality of moving average pitch angle data exceeds the reference value, the controlling means controls the drive of the actuators based on the new moving average pitch angle data if the new moving average pitch angle data accelerates the drive of the actuators in a same direction. The controlling means controls the drive of the actuators based on the new moving average pitch angle data after the drive of the actuators in operation is completed if the new moving average pitch angle data returns the drive of the actuators in a reverse direction.

In the case that the actuator being driven is driven in the direction opposite to the current driving direction, such actuator is oppositely driven against an inertia force and thus damage may be caused to the actuator. Therefore, the actuator is driven (leveled) once to the target position corresponding to the current control amount (average pitch angle data), and then the actuator is driven to the position corresponding to the new control amount (average pitch angle data). But in the case that the actuator now being driven is driven further in the same direction as the current driving direction, if the target position is changed to the position corresponding to the new control amount (average pitch angle data), no trouble such as the damage of the actuator, etc. occurs. In addition, the corresponding total driving time of the actuator can be reduced and also the time required to adjust the optical axis can be shortened.

Another feature of the car head lamp auto-leveling system is that the drive of the actuators by the controlling means in the stable vehicle posture may be executed based on the moving average pitch angle data, that is picked up in a longest moving time, out of a plurality of moving average pitch angle data in a plurality of different moving times.

There are instantaneous disturbance factors such as the unevenness of the road surface during the running of the vehicle, the movement of the crew or passenger in the cabin in the stop of the vehicle, and the like. Since the moving average pitch angle data that has the longest moving time contains a large number of pitch angle data used in the averaging process, such data is less affected by such instantaneous disturbances and has high reliability. In contrast, the moving average pitch angle data derived from a short moving time is easily affected by such disturbances in contrast to the moving average pitch angle data derived from a long moving time, and is inferior in reliability as the control amount. Therefore, it is preferable that the moving average pitch angle data that has the longest moving time and is hardly influenced by disturbances should be used as the drive control data of the actuators.

Yet another feature of the car head lamp auto-leveling system according to the invention may be that the pitch angle data used in drive control of the actuators are two types of moving average pitch angle data that each have a different moving time, respectively.

The memory portion stores two types of moving average pitch angle data that have different moving times, respectively, and the controlling means simply calculates the difference between them and compares it with a reference value. Thus, configurations of the controlling means and the memory portion are simplified rather than the case where the moving average pitch angle data of three types or more are processed.

Embodiments of the present invention will be explained with reference to examples hereinafter.

DETAILED DESCRIPTION

Figure 1:
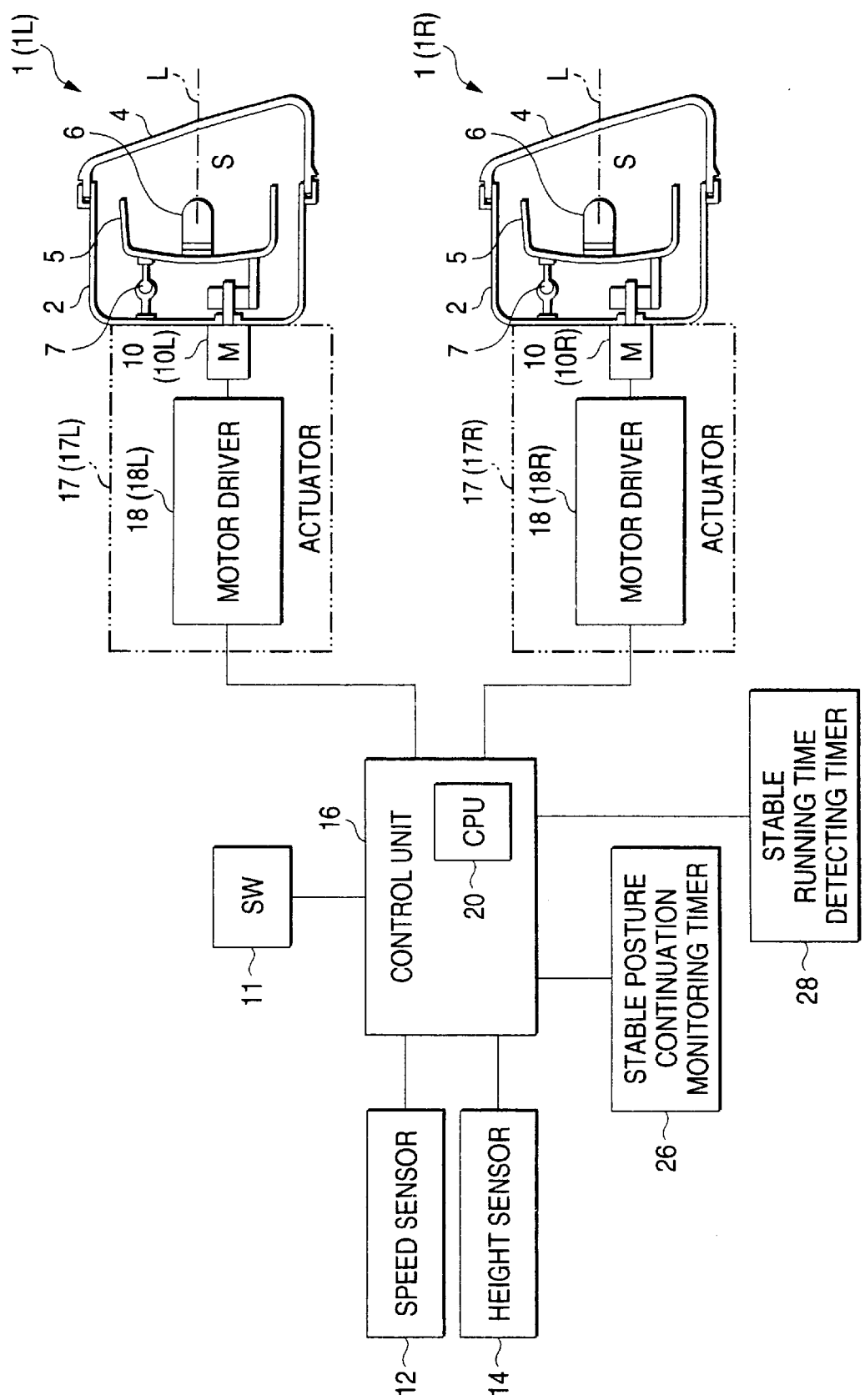
FIG. 1 is a view showing an overall configuration of a car head lamp auto/leveling system according to a first embodiment of the present invention.
Figure 2:
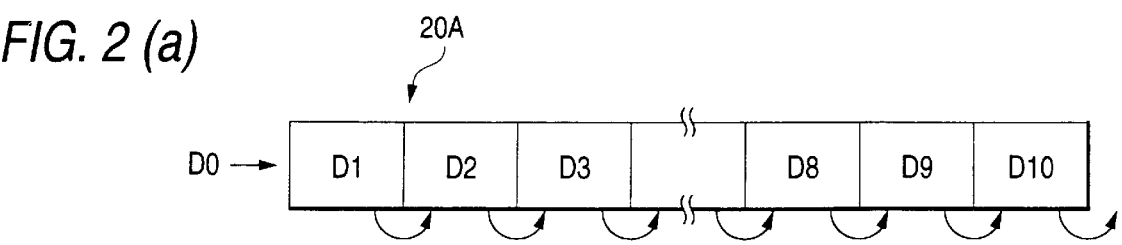
FIGS. 2(a), 2(b) and 2(c) are views showing a configuration of the memory portion shown in FIG. 1.
Figure 2:
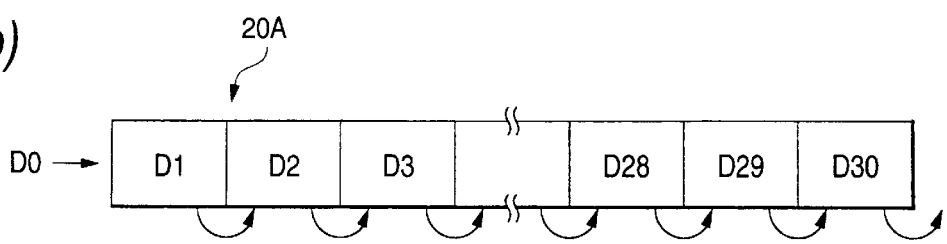
Figure 2:
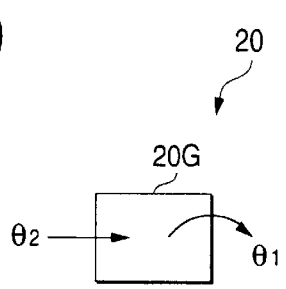

FIG. 1 to FIG. 6 show an embodiment of the present invention. In FIG. 1, a symbol 1 (1L, 1R) denotes a pair of right and left car head lamps having the same structure (the symbol 1L denotes the head lamp on the left side of the vehicle, and the symbol 1R denotes the head lamp on the right side of the vehicle). A front lens 4 is installed into the front opening portion of a lamp body 2 to form a light chamber S. In the light chamber S, a parabolic reflector 5 into which a bulb 6 as a light source is inserted is supported and may be tilted with respect to a horizontal tilting axis 7 (an axis perpendicular to a sheet surface in FIG. 1), and the tilt can be adjusted by actuators 17 (17L, 17R). The actuators 17 (17L, 17R) consist of DC motors 10 (10L, 10R) as an actuator main body and motor driver 18 (18L, 18R) for driving the DC motors 10 (10L, 10R).

The head lamp auto-leveling system includes the actuators 17 (17L, 17R) for adjusting the vertical tilt of optical axes L of the right/left head lamps 1 (1L, 1R) simultaneously respectively, a lighting switch 11 for the head lamps 1 (1L, 1R), a speed sensor 12 as a speed sensing means for detecting the speed of the vehicle, a height sensor 14 constituting a part of the vehicle pitch angle detecting means, and a CPU 16. The CPU 16 performs as a control unit for deciding an ON/OFF condition of the head lamps, deciding running/stop states of the vehicle based on a signal from the speed sensor 12, calculating an acceleration, calculating vehicle pitch angle data based on a signal from the height sensor 14, and outputting a control signal to motor drivers 18 (18L, 18R) to drive the motors 10 (10L, 10R) based on the pitch angle data when the vehicle posture is changed. A memory portion 20 stores the vehicle pitch angle data calculated by the CPU 16. A stable posture continuation monitoring timer 26 detects a stable continuation time of the vehicle posture during the stop condition, and a stable running time detecting timer 28 detects a stable running time of the vehicle.

The CPU 16, when receiving the signal from the speed sensor 12, decides based on this signal whether the vehicle is in a stopped or running condition. The CPU controls the drive of the actuator 17 (motor 10) to stop when the posture becomes stable after the vehicle posture is changed once, while controlling the drive of the actuator 17 (motor 10) only once during a running state only if predetermined stable running conditions are satisfied.

Also, the CPU 16, when receiving the signal from the height sensor 14, calculates an inclination in the longitudinal direction of the vehicle (pitch angle) based on this signal that is equivalent to an amount of change of the suspension. In the vehicle shown in this embodiment, one sensor system is employed in which the height sensor 14 is provided only to the right rear wheel suspension, and the pitch angle of the vehicle can be inferred from the amount of change of the height detected by the height sensor 14. Then, the CPU 16 outputs a signal to the motor driver 18 to tilt the optical axes L by a predetermined amount in the direction to cancel this detected pitch angle. In this case, one sensor system may be employed in which the height sensor is provided only to the right front wheel suspension, or the height sensor may be provided only to the left front wheel suspension or the rear wheel suspension.

Also, a two sensor system may be employed in which the height sensor is provided to the right or left front wheel suspension and the rear wheel suspension respectively. In this case, the inclination in the longitudinal direction of the vehicle (pitch angle) θ is calculated based on a relation of tan=h/D, where an output of the height sensor on the front wheel is H1, an output of the height sensor on the rear wheel is H2, an output difference between both height sensors is h (=H1–H2), and a wheel base distance is D.

Figure 8:
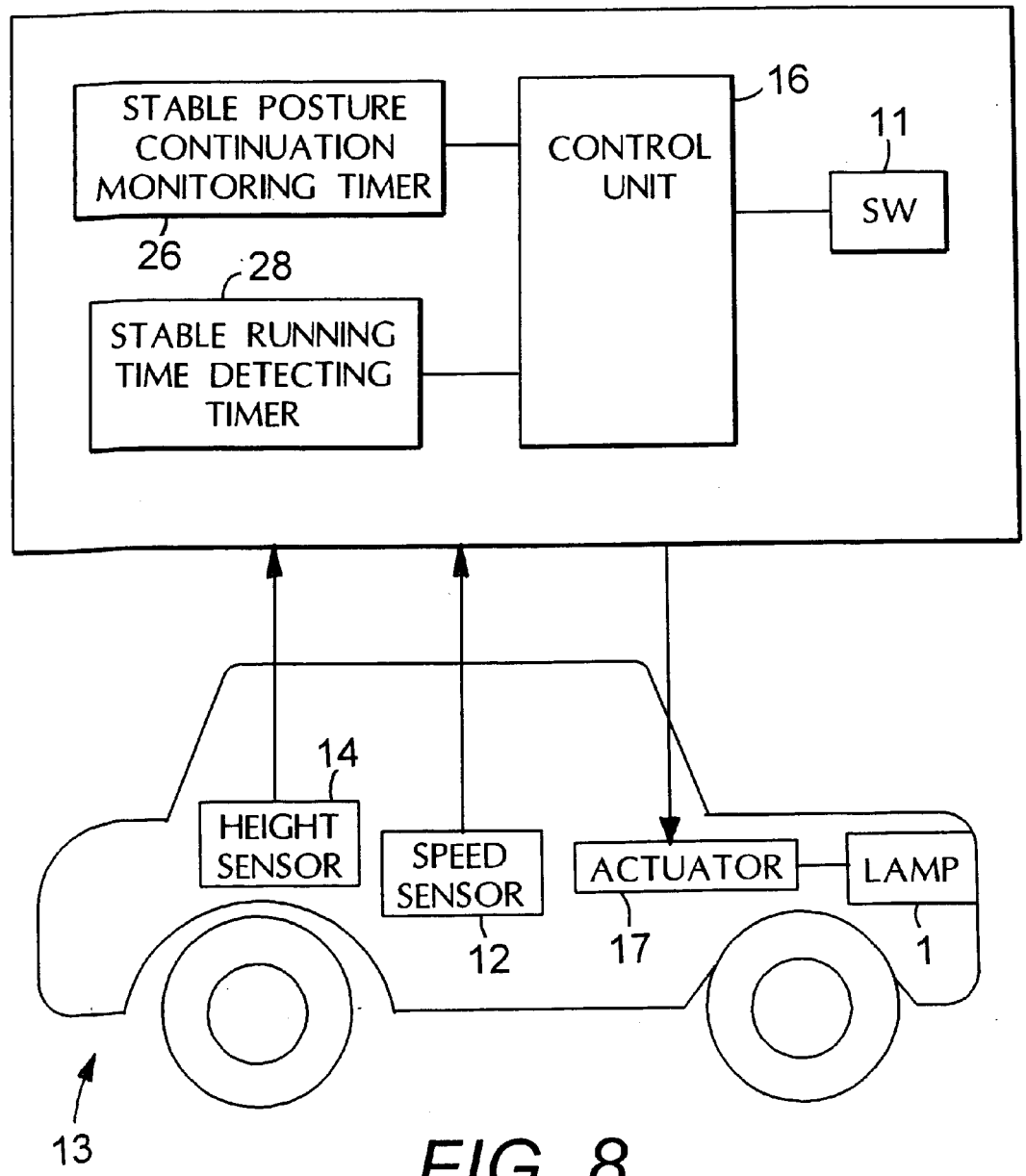
FIG. 8 is a simplified block diagram of a vehicle using a car head lamp auto-leveling system according to an embodiment of the invention.

FIG. 8 is a simplified diagram of a vehicle 13 that includes a car head lamp auto-leveling system according to an embodiment of the invention.

Also, the memory portion 20 stores the pitch angle data that are detected by the height sensor 14 and calculated by the CPU 16. As shown in FIG. 2(a), in a storing portion 20A of the memory portion 20, ten pieces of data D1 to D10 obtained by sampling at a 100 ms (0.1 second) intervals for one second are stored, and 1-second average pitch angle data obtained by averaging the data D1 to D10 are stored. FIG. 2(b) shows a storing portion 20B of the memory portion 20, wherein thirty pieces of data D1 to D30 obtained by sampling at a 100 ms (0.1 second) interval for three seconds are stored, and 3-second average pitch angle data obtained by averaging the data D1 to D30 are stored. Then, the storing portions 20A, 20B are constructed to receive new data every 100 ms (0.1 second) and to abandon the oldest data (the old data are overwritten by the new data sequentially), respectively.

Also, as shown in FIG. 2(c), the memory portion 20 has a preceding data storing portion 20G for storing the pitch angle data (3-second average pitch angle data) used to control the drive of the actuator 17 (motor 10). The preceding data $\theta_1$ that have been already stored in the preceding data storing portion 20G is overwritten by the new pitch angle data $\theta_2$ used in the drive control of the actuator 17 (motor 10) every time when the drive control of the actuator 17 (motor 10) is newly executed.

The CPU 16 also determines when the lighting switch 11 is turned ON or OFF, and then outputs a signal to the motor drivers 18 to drive the motors 10 when the lighting switch 11 is turned ON.

During the stop state, the CPU 16 controls the drive of the actuator based on the 3-second average pitch angle data in the stable posture of the vehicle when the state below the reference value is continued for a predetermined time or longer to show the stable posture of the vehicle after the difference between the 1-second average pitch angle data and the 3-second average pitch angle data is increased once to exceed the reference value.

Figure 3:
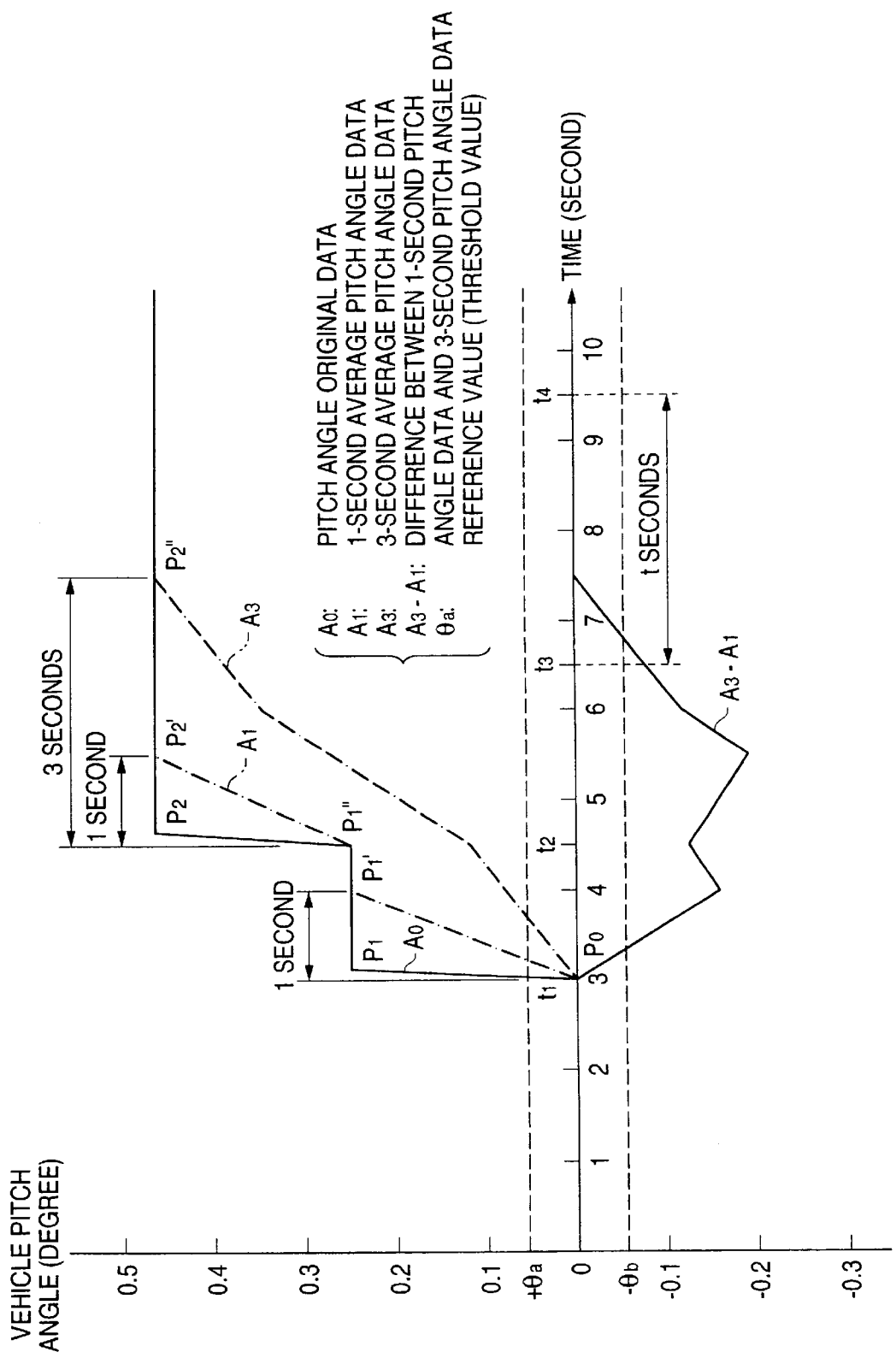
FIG. 3 is a graph showing changing behaviors of a pitch angle original data, a moving average pitch angle data, and the difference in the moving average pitch angle data according to the change in the static load applied to the vehicle.

FIG. 3 is a graph showing the changing behaviors of the pitch angle original data, the 1-second average pitch angle data, the 3-second average pitch angle data, and the difference between the 1-second average pitch angle data and the 3-second average pitch angle data, with a change in the static load applied to the vehicle, when a crew gets twice into the vehicle during the stopped state. The abscissa denotes a time (seconds) and the ordinate denotes a vehicle pitch angle (degrees). In FIG. 3, a reference $A_0$ denotes the change characteristic (solid line) of the detected pitch angle original data, a reference $A_1$ denotes the change characteristic (dot-dash line) of the 1-second average pitch angle data, a reference $A_3$ denotes the change characteristic (chain triple-dashed line) of the 3-second average pitch angle data, and a reference $A_3$–$A_1$ denotes the change characteristic (solid line) of the difference between the 1-second average pitch angle data and the 3-second average pitch angle data. A reference θa denotes a reference value (threshold value) used to decide whether or not the vehicle posture is changed and used to decide whether or not the vehicle posture is stable.

In FIG. 3, the 1-second average pitch angle data $A_1$ and the 3-second average pitch angle data $A_3$ show the step-like characteristic at points of time (t1, t2) when the crew enters the car. In the moving average pitch angle data $A_1, A_3$, since the influence of the change in the vehicle posture appears slowly if the moving average time becomes longer (3 second>1 second), the change in the vehicle posture (slant of the graph) per unit time becomes gentle.

The pitch angle original data $A_0$ becomes constant immediately after the crew gets into the car (see $P_0-P_1-P_1''$ and $P_1''-P_2-$). The I-second average pitch angle data $A_1$ becomes constant when one second elapses after the crew gets into the car (see $P_0-P_1'-P_1''$ and $P_1''-P_2'-P_2''$). The 3-second average pitch angle data $A_3$ becomes constant when three seconds lapsed after the ride of the crew has been completed (see $P_0-P_1''$). Also, the difference $|A_3-A_1|$ between the moving average pitch angle data (the 1-second average pitch angle data $A_1$ and the 3-second average pitch angle data $A_3$) changes to exceed the reference value (threshold value) immediately after the crew gets into the car, and then becomes constant 0 degree) when three seconds lapsed after the ride of the crew has been completed, like the case of the 3-second average pitch angle data $A_3$.

In other words, it can be seen that, since the difference $|A_3-A_1|$ between the moving average pitch angle data (the 1-second average pitch angle data $A_1$ and the 3-second average pitch angle data $A_3$) exceeds the reference value θa, the vehicle posture is changed. Then, it can be seen that, since the difference $|A_3-A_1|$ between the moving average pitch angle data is reduced smaller than the reference value θa, i.e., $|A_3-A_1|<θa$ and then this state ($|A_3-A_1|<θa$) is continued for a predetermined time t or more, that the vehicle posture has become stable after the vehicle posture is once changed. Then, if the vehicle posture has become stable after the vehicle posture is once changed, the control (leveling) of the drive of the actuator is executed based on the vehicle posture in the stable state (high precision 3-second average pitch angle data).

Figure 4:
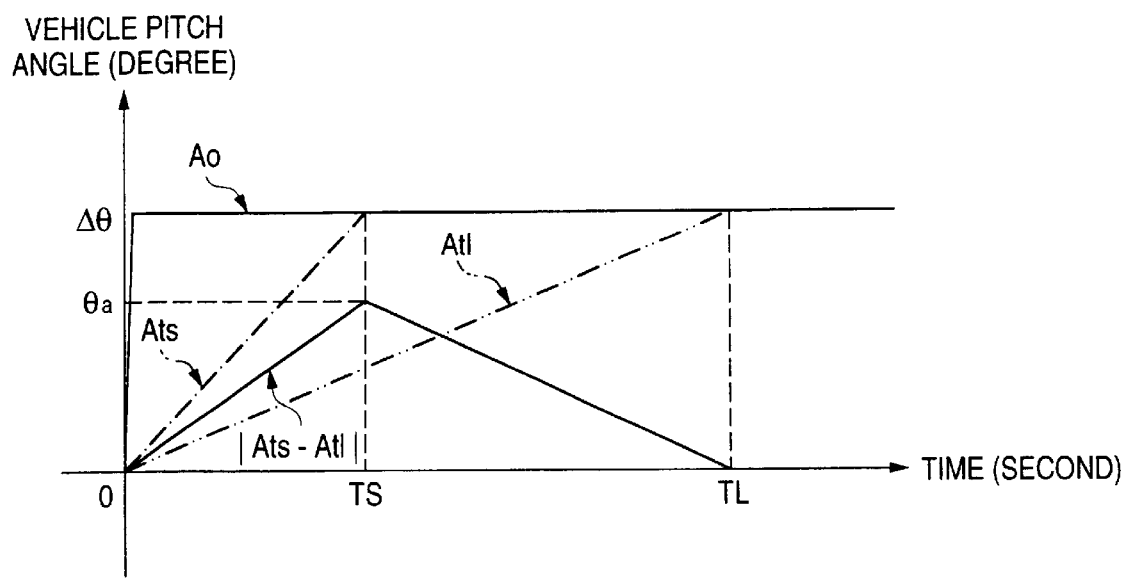
FIG. 4 is a characteristic graph showing change in a TS second average pitch angle data, a TL second average pitch angle data, and the difference between both data.

Then, as the reference value θa used to decide whether or not the vehicle posture is changed, a reference value $θa=Δθ(TL-TS)/TL$ may be set, where an amount of detected change in the any vehicle posture is Δθ, a long moving average time is TL, and a short moving average time is TS. FIG. 4 is a characteristic graph showing change in a TS second average pitch angle data, a TL second average pitch angle data, and the difference between both data. That is, FIG. 4 is a characteristic graph showing the change in TS second average pitch angle data, TL second average pitch angle data, and the difference between both data. In FIG. 4, a straight line A0 shows a pitch angle original data characteristic, a straight line Ats shows a TS second average pitch angle data characteristic, a straight line Atl shows a TL second average pitch angle data characteristic, and a straight line |Ats−Atl| shows a characteristic of a difference between the TS second average pitch angle data and the TL second average pitch angle data. In FIG. 4, since the slope of the straight line Ats is given by Δθ/TS and the slope of the straight line Atl is given by Δθ/TL, the difference |Ats−Atl| between the TS second average pitch angle data and the TL second average pitch angle data becomes Δθ·T/Ts−Δθ·T/TI. Then, this difference is maximized when T=Ts, and a maximum value is given by Δθ·TS(TL−TS)/TS·TL=Δθ(TL−TS)/TL. Accordingly, the reference value θa may be set smaller than this maximum value Δθ (TL−TS)/TL.

Then, in the present embodiment, an amount of detected change in the vehicle posture Δθ is set to 0.1 degree, the long moving average time TL is set to three second used in the 3-second average, the short moving average time TS is set to one second used in the 1-second average, and the reference value Δθ is set to about 0.067 degree.

Also, a predetermined time (continuation monitoring time) t used to decide whether or not the vehicle posture is stabilized may be set arbitrarily in the range of 3 to 6 seconds. That is, in order to reduce the number of times the actuator is driven, the time in which at least plurality of times of posture controls can be collected to one operation is desirable. Also, a time that exceeds the time required to get into and out of the vehicle and to load/unload baggage is desirable. Further, in order not to arouse a strange feeling in the driver, it is desirable to set the time as short as possible. Thus, in light of the above considerations, in this implementation four seconds is set as the predetermined time (continuation monitoring time) to decide the change in the vehicle posture.

As described above, the CPU 16 decides that the vehicle posture is changed when the difference $|A_3-A_1|$ between the moving average pitch angle data (the 1-second average pitch angle data $A_1$ and the 3-second average pitch angle data $A_3$) exceeds the reference value θa. The CPU then decides that the vehicle posture has become stable when the difference $|A_3-A_1|$ between the moving average pitch angle data is reduced to be smaller than the reference value θa ($|A_3-A_1|<θa$) and then this state ($|A_3-A_1|<θa$) is continued for a predetermined time t or more. The CPU then executes the control (leveling) of the drive of the actuator based on the vehicle posture in the stable state (3-second average pitch angle data). In this case, if the drive control of the actuator is executed for the first time after the stop of the vehicle, the CPU 16 decides that the vehicle posture is stabilized when the state that the difference $|A_3|A_1|$ between the moving average pitch angle data is smaller than the reference value θa ($|A_3-A_1|<θa$) is continued for a predetermined time (four seconds) or more in disregard of the condition that the difference $|A_3-A_1|$ between the moving average pitch angle data exceeds the reference value θa once, and then controls (levels) the drive of the actuator based on the 3-second average pitch angle data in the stable vehicle posture state if the optical axis is deviated at that time.

In other words, as characteristic of vehicle suspensions, sometimes the suspension is not expanded and contracted when the static load applied to the vehicle during the stopped state is small. In such a case, normally the change in vehicle posture can be detected since the difference between the moving average pitch angle data exceeds the reference value because of people getting on and off during the stopped condition, nevertheless the situation that the change in the vehicle posture cannot be detected is brought about since the suspension is not changed. Then, the suspension is restored to the stroke equivalent to the static load after the expansion and contraction of the suspension is repeated by the running of the vehicle, and as a result the vehicle posture is changed. But the vehicle posture is not changed (varied) in the stopped state after moving but is changed during the running state. Accordingly, there is no situation to clear the condition that the difference between the moving average pitch angle data exceeds the reference value unless the new change of the vehicle posture is caused after the stop in which the vehicle posture is in the stable state. Thus, although the vehicle posture is changed in response to the small static load applied prior to the running, such change of the vehicle posture cannot be detected and thus there is the possibility that leveling is not carried out. For this reason, in the case that the drive control of the actuator should be executed for the first time after the stop of the vehicle, the drive control of the actuator is executed to adjust the optical axis with regard to the above characteristic of the suspension if the deviation of the optical axis is detected even in the situation that the difference between the moving average pitch angle data does not exceed the reference value (the change of the vehicle posture cannot be detected), whereby the irrationality due to the characteristic of the suspension can be overcome.

Also, the deviation of the optical axis is decided based on that the difference between the pitch angle data at this time and the pitch angle data used in the preceding drive control of the actuator exceeds a predetermined value. In this case, if the drive control of the actuator is executed when such difference exceeds the reference value that is more than the pitch angle equivalent to the hysteresis width of the actuator driving circuits of the right and left head lamps, the problem wherein only one head lamp is leveled can be avoided.

In other words, the CPU 16 drives the actuators 17L, 17R when the difference between the pitch angle data calculated based on the signal from the height sensor 14 and the pitch angle data used in the preceding drive control of the actuator exceeds the predetermined reference value that is more than the pitch angle equivalent to the hysteresis width of the actuator driving circuits of a pair of right and left head lamps 1R, 1L, but does not drive the actuators 17L, 17R when such difference is below the predetermined reference value.

Figure 5:
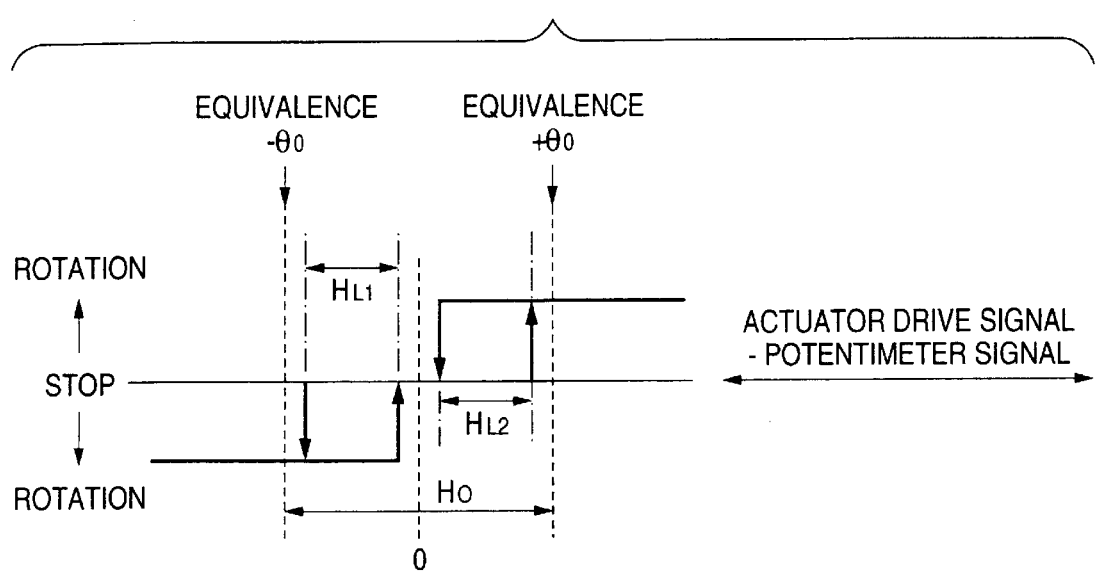
FIG. 5(a) is a diagram showing a hysteresis in an actuator driving circuit of the left-side head lamp and a reference value as the reference used to drive the actuator.
FIG. 5(b) is a diagram showing a hysteresis in an actuator driving circuit of the right-side head lamp and a reference value as the reference used to drive the actuator.
Figure 5:
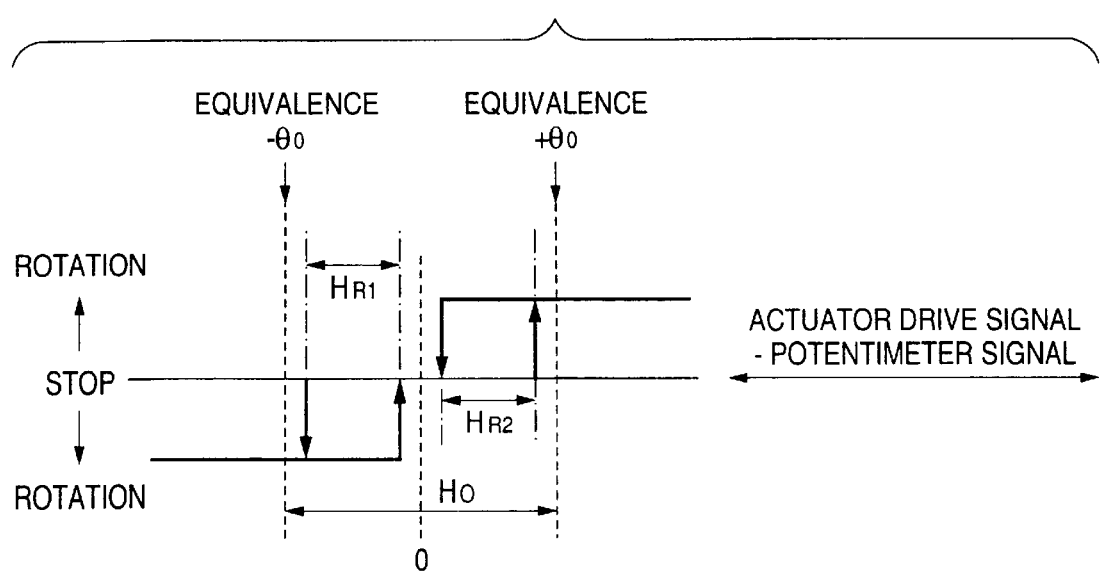

An operation of this CPU 16 will be explained with reference to FIGS. 5(*a*) and 5(*b*) hereunder. FIG. 5(*a*) is a diagram showing the hysteresis in the actuator driving circuit of the left-side head lamp and the reference value as the reference used to drive the actuator. FIG. 5(*b*) is a diagram showing the hysteresis in the actuator driving circuit of the right-side head lamp and the reference value as the reference used to drive the actuator. The hystereses HL1, HL2 are present in the actuator driving circuit of the left-side head lamp, and the hystereses HR1, HR2 are present in the actuator driving circuit of the right-side head lamp. Then, a predetermined reference pitch angle $\theta_0$ that is more than the pitch angle equivalent to the hystereses HL1(HL2), HR1(HR2) of the right and left actuator driving circuits is set previously in the CPU 16 as a reference value serving as the reference to drive the actuator. In FIGS. 5(*a*) and 5(*b*), H0/2 is the hysteresis width equivalent to the reference pitch angle $\theta_0$, and H0/2>HL1 and H0/2>HR1(HR2).

Then, the CPU 16 calculates the 3-second average pitch angle data $\theta_2$ based on the new pitch angle detected by the height sensor 14, then compares this 3-second average pitch angle data $\theta_2$ with the 3-second average pitch angle data $\theta 1$ used to previously control the actuator, and then decides whether or not the difference $|\theta_2-\theta_1|$ is larger than this predetermined reference pitch angle $\theta_0$. Then, the CPU 16 operates both actuators (motors 10L, 10R) simultaneously if the difference is larger than this predetermined reference pitch angle ($|\theta_2-\theta_1|>\theta_0$), but the CPU 16 does not operate both actuators (motors 10L, 10R) if the difference is smaller than this predetermined reference pitch angle ($|\theta_{2-01}|<\theta_0$). Accordingly, a situation wherein one of the left and right head lamps is leveled but the other is not leveled is never caused. That is, the left and right head lamps 1L, 1R are leveled at the same time.

When the new moving average pitch angle data accelerates the drive of the actuator in the same direction under the situation that the new vehicle posture stable state in which the state below the reference value $\theta a$ is continued for the predetermined time (4 second) or more is brought about after the difference $|A_3-A_1|$ between the moving average pitch angle data exceeds the reference value $\theta a$ (0.067 degree) in operation of the actuator, the CPU 16 controls the drive of the actuator in operation based on the new moving average pitch angle data. In contrast, when the new moving average pitch angle data returns the drive of the actuator in the reverse direction, the CPU 16 controls the drive of the actuator in operation based on the new moving average pitch angle data after the drive of the actuator in operation is completed.

More particularly, in the case that the actuator is being driven in a direction opposite to the current driving direction, such actuator is oppositely driven against an inertia force and thus it is possible to damage the actuator. Therefore, the actuator is driven (leveled) once to the target position corresponding to the current control amount (average pitch angle data), and then the actuator is driven to the position corresponding to the new control amount (average pitch angle data). In contrast, in the case that the actuator being now driven is driven further in the same direction as the current driving direction, if the target position is changed to a position corresponding to the new control amount (average pitch angle data), no trouble, such as the damage of the actuator, occurs and in addition, the total driving time of the actuator can be reduced correspondingly and the time required to adjust the optical axis can be shortened. Therefore, the target position corresponding to the current control amount (average pitch angle data) is changed to the position corresponding to the new control amount (average pitch angle data).

As described above, if the vehicle posture is changed during the stopped state, the CPU 16 controls the drive of the motor 10 based on the latest 3-second average pitch angle data. In this case, sometimes the leveling (optical axis correction) is performed based on the pitch angle data detected during an improper stop state of the vehicle, like the case where the vehicle is stopped on a sloping road, or the case where the vehicle is stopped to ride up on the sidewalk, or the like. Therefore, the CPU 16 can correct such erroneous leveling (optical axis correction) by controlling the drive of the motor 10 only once based on the 3-second average pitch angle data detected during the stable running inasmuch as the vehicle is running stably. In this case, if the pitch angle data during the stopped state of the vehicle is proper (the vehicle is not stopped in an unnatural manner like the case where the vehicle is stopped on a sloping road, or the case where the vehicle is stopped on the sidewalk, etc), the pitch angle data during the stable running condition is substantially equal to the pitch angle data during the stopped state of the vehicle. Therefore, the position of the optical axis which is subjected to the leveling based on the pitch angle data in the stable running condition is positioned at almost the same position as the optical axis which is decided by the last leveling executed during the stopped state of the vehicle.

Also, in order to reject a disturbance during the moving state, the CPU 16 controls (levels) the drive of the motor 10 only if the speed is more than the reference value and the acceleration is below a reference value, and also such state (the state in which the speed is more than the reference value and the acceleration is below the reference value) is kept for a predetermined amount of time or more (at the time of stable moving state).

For example, the vehicle cannot be driven at a speed of more than 30 km/h on a rough road such as an uneven road surface that contains many elements to cause disturbances, and thus it is proper that the acceleration should be limited to less than 0.78 m/s$^2$ to eliminate sudden acceleration and deceleration conditions which cause changes in the vehicle posture. Accordingly, the state which has a speed of more than 30 km/h and an acceleration of less than 0.78 m/s$^2$ and which is continued for three seconds or more is selected as the conditions that define the stable running state. If the pitch angle of the vehicle is calculated only when such conditions are satisfied, the detection of sudden abnormal values can be prevented and the CPU 16 is hardly affected by such influences. Since the CPU 16 monitors the count of the stable running time detecting timer 28 which is started at a point of time when the state having the speed of more than 30 km/h and the acceleration of less than 0.78 m/s² is detected, it can detect whether or not the stable running state is continued for three seconds or more.

Also, the actuator 17 has a fail-safe function (circuit) that holds the position at the current driving position as it is when it receives the abnormal input signal. There is the possibility that, if the electromagnetic noise superposed on the signal path to the actuator is small, the fail-safe circuit does not operate and thus the actuator 17 is operated unexpectedly by electromagnetic noise. Therefore, when the CPU 16 does not intend to drive the actuator 17, it causes the actuator to positively function the fail-safe circuit by setting the output of the signal path to the actuator 17 to 0 V, so that the unexpected drive of the actuator 17 by the electromagnetic noise or the like can be prevented.

Next, drive control of the motor 10 by the CPU 16 as a control unit will be explained in compliance with a flowchart shown in FIGS. 6(*a*) and 6(*b*) hereunder.

First, in steps 102, 104, the speed and the acceleration are calculated based on the output from the speed sensor 12, respectively. In steps 106, 108, the 1-second average vehicle pitch angle data and the 3-second average vehicle pitch angle data are calculated based on the output from the height sensor 14 respectively and then are stored in the memory portion 20. Then, in step 110, it is decided based on the output from the lighting switch 11 whether or not the head lamps are turned ON. Then, if YES (the head lamps are being turned ON), the process goes to step 120. If NO (the head lamps are turned OFF), a running correction flag is reset in step 112, a first flag is set in step 114, and a height change flag is reset in step 116. Then, the process returns to step 102. The running correction flag is a flag that is set when the stable running state can be achieved during the running of the vehicle. The first flag is a flag that is set to decide whether or not the control is the first control after the stop of the vehicle. The height change flag is a flag that is set when the vehicle posture is changed during the stopped state of the vehicle.

In step 120, it is decided based on the output of the speed sensor 12 whether or not the vehicle is running. Then, if NO (the vehicle is stopped) in step 120, the running correction flag is reset in step 121 if such flag is set, and then the process goes to step 122 wherein it is decided whether or not the first flag is set. Then, if NO in step 122 (the first flag is not set, i.e., the control is not the first control after the stop), the process goes to step 123 wherein it is decided whether or not the height change flag is set. If YES in step 123 (the height change flag is set, i.e., the vehicle posture is changed), the process goes to step 124 wherein it is decided whether or not the difference $|A_3-A_1|$ between the moving average pitch angle data is below the reference value θa. Then, the process goes to step 125 if YES ($|A_3-A_1|<θa$), and the process goes to step 150 if NO ($|A_3-A_1|>θa$). In step 125, it is decided whether or not the state in which the difference between the moving average pitch angle data is below the reference value reference ($|A_3-A_1|<θa$) is continued for a predetermined time (e.g., 4 seconds). Then, if YES, the height change flag is reset in step 126, and then the 3-second average vehicle pitch angle stored in the memory portion 20 is selected in step 127. Then, the process goes to sequence 140.

In contrast, if in step 123 the answer is NO (the height change flag is not set, i.e., the vehicle posture is not changed), the process goes to step 128 wherein it is decided whether or not the difference $|A_3-A_1|$ between the moving average pitch angle data exceeds the reference value θa. Then, if YES ($|A_3-A_1|>θa$, i.e., the change in the vehicle posture can satisfy the reference), the height change flag is set in step 129. Then, the process goes to step 150. In contrast, if NO (($|A_3-A_1|<θa$, i.e., the change in the vehicle posture cannot satisfy the reference) in step 128, the process goes to step 150 without the routing of step 129.

In contrast, if YES in step 122(the first flag is set, i.e., the control is the first control after the stop of the vehicle), it is decided in step 134 whether or not the difference between the moving average pitch angle data is below the reference value, not to decide whether or not the height change flag is set. Then, if YES in step 134 (($|A_3A_1|<θa$), the process goes to step 135 wherein it is decided whether or not the state in which the difference between the moving average pitch angle data is below the reference value reference ($|A_3-A_1|<θa$) is continued for the predetermined time (e.g., 4 seconds). Then, if YES in step 135, the first flag is reset in step 136 and then the 3-second average vehicle pitch angle data stored in the memory portion 20 is selected in step 137. Then, the process goes to step 140. In contrast, if NO in step 134 (($|A_3-A_1|>θa$) and if NO in step 135 (the state of $|A_3-A_1|<θa$ is not continued for 4 seconds), the process goes to step 150.

The sequence of stops of 140 is a control sequence that executes the drive control of the actuator, inasmuch as the moving average pitch angle data used to control the drive of the actuator is larger than the reference value that exceeds the pitch angle equivalent to the hysteresis width of the actuator driving circuits of the left and right head lamps. The control sequence 140 also controls the drive of the actuator in operation based on the new moving average pitch angle data if such new moving average pitch angle data accelerates the drive of the actuator in operation in the same direction, while causing the drive control of the actuator based on such new moving average pitch angle data to standby until the drive of the actuator in operation is completed, if the new moving average pitch angle data returns the drive of the actuator in operation in the opposite direction.

More particularly, in step 142, a decision is made whether or not the difference between the selected 3-second average pitch angle data and the pitch angle data used in the preceding drive control (leveling) of the actuator (the 3-second average pitch angle data stored in the preceding control data storing portion 20G of the memory portion 20) is larger than the reference value. Then, if YES in step 142 (the difference is larger than the reference value), an operation enabling flag is set in step 143, and then the process goes to step 144. In contrast, if NO in step 142 (the difference is smaller than the reference value), and then the process goes directly to step 144 and bypasses step 143.

In step 144, it is decided whether or not the actuator is in operation. If YES (the actuator is in operation), a decision is made in step 145 whether or not the target position of the actuator that corresponds to the selected 3-second average pitch angle data is in the same direction as the driving direction of the actuator now being operated. Then, if NO in step 145 (the target position of the actuator that corresponds to the selected 3-second average pitch angle data is in the opposite direction to the driving direction of the actuator being now operated), a standby flag is set in step 146, and then the process goes to step 144. In contrast, if YES in step 145 (the target position of the actuator that corresponds to the selected 3-second average pitch angle data is in the same direction as the driving direction of the actuator being now operated), the process goes directly to step 150 and bypasses step 146. Also, if NO (the actuator is not in operation) in step 144, the process goes to step 150.

In step 150, it is decided whether or not an operation enabling flag has been set. If YES (the operation enabling flag is set), it is decided in step 151 whether or not a standby flag is set. If NO in step 151 (the standby flag is not set), the process goes to step 152 wherein the drive of the actuator is controlled based on the selected 3-second average pitch angle data and also this 3-second average pitch angle data used in the control is stored in the memory portion 20G as the preceding control data. Then, the process goes to step 153. In contrast, if YES in step 151 (the standby flag is set), the process goes directly to step 153 bypassing step 152. Then, in step 153, it is decided whether or not the control operation of the actuator is ended. If YES (the control operation of the actuator is ended), the process goes to step 154 wherein the standby flag is set. If YES in step 154 (the standby flag is set), the standby flag is reset in step 155, and then the process returns to step 102. In contrast, if NO in step 154 (the standby flag is not set), the operation enabling flag is reset in step 156, then the output of the actuator is set to 0 V in step 157, and then the process returns to step 102. Also, if NO in step 150 (the operation enabling flag is not set) or if NO in step 153 (the control operation of the actuator is ended), the process returns directly to step 102.

Also, if YES (the vehicle is moving) in step 120, the process goes to step 160 wherein it is decided whether or not a running correction flag is set (the optical axis correction, i.e., the leveling is executed during the running). If NO (the running correction flag is not set (the optical axis correction, i.e., the leveling is not executed during the running)), it is decided whether or not the speed of the vehicle exceeds the reference value (30 km/h) in step 161. If YES in step 162 (the speed exceeds 30 km/h), it is decided whether or not the acceleration is less than the reference value (0.78 m/s$_2$). If YES (the acceleration is less than 0.78 m/s$^2$) in step 162, the process goes to step 163 wherein it is decided whether or not the state having the speed of more than 30 km/h and the acceleration of less than 0.78 m/s$^2$ is continued for a predetermined time (3 seconds). Then, if YES in step 163 (such state is continued for 3 seconds), the running correction flag is set in step 164, then the 3-second average vehicle pitch angle data stored in the memory portion 20 is selected in step 165. Then, the first flag is set in step 166, the height change flag is reset in step 167, and then the process goes to control sequence 140.

Also, if YES in step 160 (the running correction flag is set (the optical axis correction, i.e., the leveling is executed during the running), or if NO in step 161 (the speed is below 30 km/h), or if NO in step 162 (the acceleration is more than 0.78 m/s$^2$), or if NO in step 163 (such state is not continued for 3 seconds), the process goes directly to step 160 in all cases bypassing control sequence 140.

Figure 6:
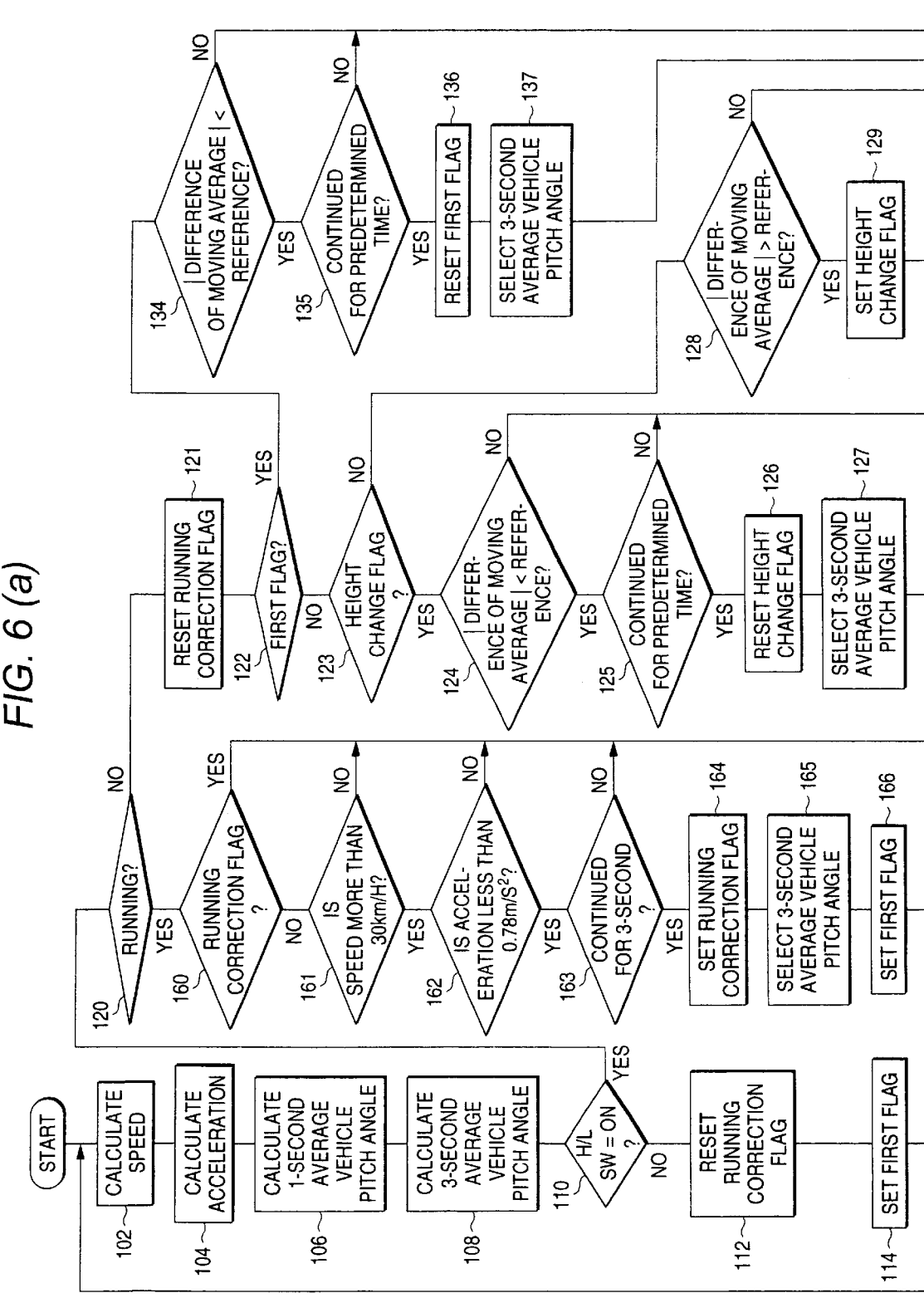
FIGS. 6(a) and 6(b) depict a flowchart of the CPU as a control portion of the same system.

In the above embodiment of FIGS. 6(*a*) and 6(*b*), if the control is the first drive control of the actuator after the vehicle has stopped, the process goes to control sequence 140 by providing step 122, steps 134, 135, 136, 137 between step 12 and the control sequence 140 disregards the condition that the difference |A$_3$–A$_1$| between the moving average pitch angle data exceeds the reference value θa (not to decide the change in the vehicle posture). There is no need that these steps 122, and 134, 135, 136, 137 should always be provided.

Figure 7:
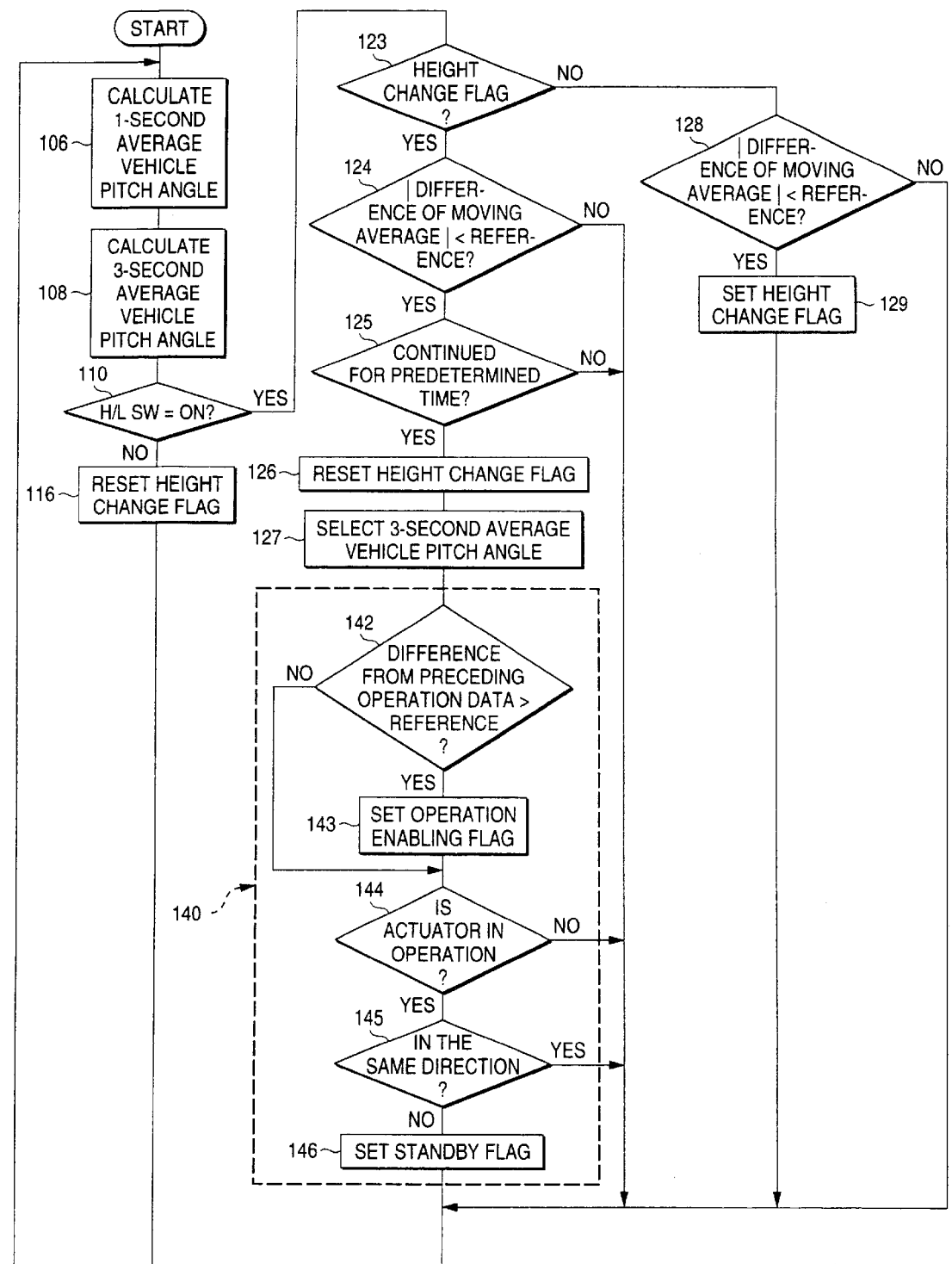
FIGS. 7(a) and 7(b) depict a flowchart of the CPU as a control portion of a car headlamp auto-leveling system according to a second embodiment of the invention.
Figure 7:
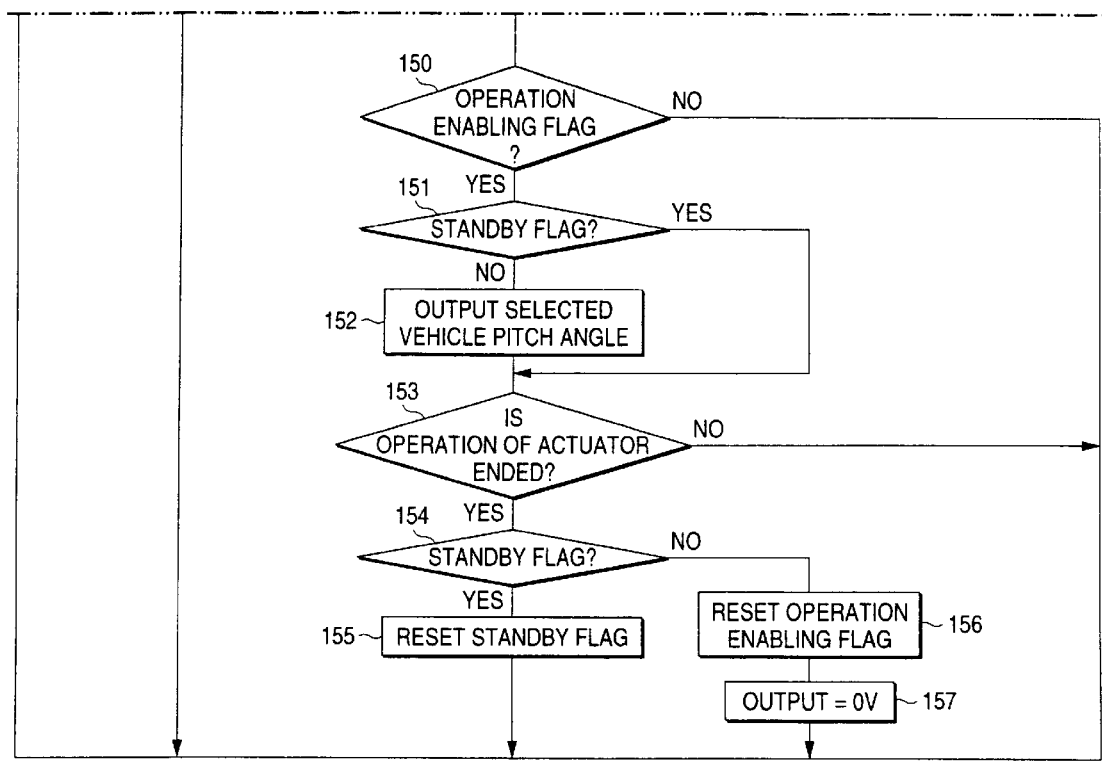

FIGS. 7(*a*) and 7(*b*) depict a flowchart of CPU as the control portion of the car head lamp auto-leveling system according to a second implementation.

In the above first embodiment, the CPU 16 decides based on the output of the speed sensor 12 that the vehicle is in the stopped state or in a moving state. Then, in the stopped state of the vehicle, the CPU 16 controls the drive of the actuator based on the 3-second average pitch angle data in this stable vehicle posture when the stable vehicle posture in which the state below the reference value θa is continued for a predetermined time (such as 4 seconds) can be maintained after the difference |A$_3$–A$_1$| between the moving average pitch angle data exceeds the reference value θa. During the running state, the CPU 16 controls the drive of the actuator if stable running conditions such as a speed of more than 30 km/h, an acceleration of less than 0.78 m/s$^2$, and a 3-second duration can be satisfied. In contrast, in the second embodiment, in either the stopped state of the vehicle or during the running state, the CPU 16 controls the drive of the actuator based on the 3-second average pitch angle data in this stable vehicle posture when the stable vehicle posture in which the state below the reference value θa is continued for the predetermined time (4 seconds) can be maintained after the difference |A$_3$–A$_1$| between the moving average pitch angle data exceeds the reference value θa.

In this second embodiment, since the drive of the actuator is controlled without discriminating between the stop state and the running state of the vehicle, the speed sensor 12 is not always needed, and thus the configuration becomes correspondingly simple.

Also, in the first embodiment, even if the predetermined stable running conditions are satisfied while the vehicle is moving, sometimes the proper pitch angle data cannot be detected, for example, when the vehicle is turning, the vehicle is slalom running, the vehicle is moving on a rough road, and the like. In other words, since the influence of turning forces and the influence of the unevenness of the road surface appear on the detected pitch angle data when the vehicle is turning or when the vehicle is slalom running, and when the vehicle is moving on a rough road, the pitch angle data that are clearly different from those in the stable running state such as the running in which no turning force is applied, the running on the smooth surface, etc. are detected. Thus, since the stable running conditions are satisfied in these running states which are normally rejected as the unstable running state, there is such a possibility that the leveling (optical axis correction) is performed based on the improper pitch angle data.

However, in the present embodiment, since the drive control of the actuator (leveling) is executed during vehicle movement only if the similar conditions to those in the stopped state of the vehicle (the state below the reference value θa is continued for the predetermined time after the difference |A$_3$–A$_1$| between the moving average pitch angle data exceeds the reference value θa) are satisfied, the improper auto-leveling caused when the vehicle is turning, or the vehicle is slalom running, or when the vehicle is moving on a rough road can be avoided without fail.

The process flow in the second embodiment of FIGS. 7(*a*) and 7(*b*) is constructed by removing step 102, step 104, step 112, step 114 and step 120, steps 160 to 167, and step 121, step 122, steps 134 to 137 from the process flow in the first embodiment of FIGS. 6(*a*) and 6(*b*). Since the other steps are identical to the above process flow of the first embodiment, their redundant explanation will be omitted by affixing the same reference numbers of FIGS. 6(*a*) and 6(*b*) into FIGS. 7(*a*) and 7(*b*).

Also, in the first and second embodiments, it is decided that the vehicle posture is changed if the difference between the moving average pitch angle data of two types (the 1-second average pitch angle data and the 3-second average pitch angle data) exceeds the reference value. But the change in the vehicle posture may be decided under the condition that the differences between the moving average pitch angle data of three types or more exceeds the reference values respectively.

Also, in the above embodiments, the auto-leveling in the reflector-moving type head lamp in which the reflector 5 is provided to the lamp body 2 fixed to the car body to be tilted is explained. The present invention can be applied similarly to the auto-leveling in the unit-moving type head lamp in which the lamp body/reflector unit is provided to the lamp housing fixed to the car body to be tilted.

As apparent from the above explanation, according to the car head lamp auto-leveling system, if the vehicle posture is changed in the stop of the vehicle or the running, the drive control of the actuator (leveling) is executed at the constant short timing after the vehicle posture is changed. Therefore, the operation frequency of the actuator can be reduced, the durability of the actuator can be guaranteed correspondingly and no unpleasant feeling is aroused in the driver.

Also, since the auto-leveling is executed based on the proper pitch angle data during the moving state, the false leveling in the stopped state of the vehicle can be corrected properly during the running state and thus the driving safety of both the driver and other cars can be assured.

Also, according to the car head lamp auto-leveling system, the auto-leveling under abnormal conditions such as when the vehicle is turning, the vehicle is slalom running, or the vehicle is traveling on a rough road and the like, can be avoided and the auto-leveling based on the proper pitch angle data can also be executed as the vehicle is moving. Therefore, the false leveling executed in the stopped state can be properly corrected during traveling and thus the driving safety of both the driver and other vehicles can be assured.

In the case that the suspension is restored to the proper state during vehicle movement after the change in the vehicle posture is not detected since the suspension does not sufficiently operate, the actuator can be driven (leveled) if the deviation of the optical axis can be checked without the detection of the change in the vehicle posture by the first control after the stop of the vehicle. Therefore, quick auto-leveling is executed and thus the driving safety of both the driver and other vehicles can be assured.

If the new control amount is in the opposite direction to the driving direction of the actuator now being driven, the actuator is driven based on the new control amount after the actuator is driven (leveled) based on the current control amount. Therefore, the actuator is not damaged and its life is prolonged. In contrast, if the new control amount is in the same direction as the driving direction of the actuator now being driven, the actuator is driven based on the new control amount. Therefore, the total driving time of the actuator can be reduced correspondingly and also the time required to adjust the optical axis can be shortened.

The drive of the actuator is controlled based on the pitch angle data that is hardly affected by the influence of any disturbances. Therefore, the proper auto-leveling can be carried out.

The drive of the actuator is controlled (leveled) by using the difference between the moving average pitch angle data of two types. Therefore, the configuration of the controlling means becomes simple, and consequently the auto-leveling system can be provided inexpensively.

What is claimed is:

1. A car head lamp auto-leveling system comprising:
head lamps whose optical axis are tilted vertically relative to a vehicle body by a drive of an actuator;
a controlling means for controlling the drive of the actuator;
a speed sensing means for sensing a speed of a vehicle;
a pitch angle detecting means provided to at least one of left and right sides of at least one of a front wheel suspension and a rear wheel suspension, for detecting a pitch angle of the vehicle; and
a memory portion for storing pitch angle data of the vehicle detected by the pitch angle detecting means;
wherein the controlling means:
calculates moving average pitch angle data during a plurality of different moving times based on the pitch angles detected by the pitch angle detecting means, respectively,
stores the moving average pitch angle data in the memory portion, discriminates stopped and moving states of the vehicle based on an output of the speed sensing means,
controls the drive of the actuators in the stopped state based on the moving
average pitch angle data collected during a stable vehicle posture wherein the stable vehicle posture is a state below a reference value that continues for at least a predetermined time and is maintained after the difference between respective moving average pitch angle data during a plurality of different moving times is increased once to exceed the reference value; and
wherein the pitch angle data used in the drive control of the actuators are two types of moving average pitch angle data that have different moving times, respectively.

2. A car head lamp auto-leveling system comprising:
head lamps whose optical axis are tilted vertically relative to a vehicle body by a drive of an actuator;
a controlling means for controlling the drive of the actuator;
a pitch angle detecting means provided to at least one of left and right sides of at least one of a front wheel suspension and a rear wheel suspension, for detecting a pitch angle of the vehicle; and
a memory portion for storing pitch angle data of the vehicle detected by the pitch angle detecting means;
wherein the controlling means:
calculates moving average pitch angle data during a plurality of different moving times based on the pitch angles detected by the pitch angle detecting means, respectively,
stores the pitch angle data in the memory portion, and
controls the drive of the actuators in both stop and running states of the vehicle
based on the moving average pitch angle data collected during a stable vehicle posture, wherein the stable vehicle posture is that state,
wherein the moving average pitch angle is below a reference value and continues for at least a predetermined time and is maintained after the difference between the respective moving average pitch angle data during a plurality of different moving times is increased once to exceed the reference value; and
wherein the pitch angle data used in the drive control of the actuators are two types of moving average pitch angle data that have different moving times, respectively.

3. A car head lamp auto-leveling system according to claim 1 or 2, wherein a first drive control of the actuators by the controlling means decides the stable vehicle posture when a state occurs defined by the difference between the plural moving average pitch angle data being smaller than the reference value and continued for at least a predetermined time in disregard of a condition that the difference between the plural moving average pitch angle data during different moving times increases once to exceed the reference value, and then controls the drive of the actuators based on the moving average pitch angle data collected during a stable vehicle posture state when the difference between the moving average pitch angle data in the stable vehicle posture and the pitch angle data used in preceding drive control of the actuators exceeds a predetermined value.

4. A car head lamp auto-leveling system according to claims 1 or 2, wherein, when a new vehicle posture stable state in which a state below the reference value is continued for at least a predetermined time is brought about during operation of the actuators, after the difference between plural moving average pitch angle data exceeds the reference value, the controlling means drives the actuators based on the new moving average pitch angle data if the new moving average pitch angle data accelerates the drive of the actuators in a same direction, whereas the controlling means drives the actuators based on the new moving average pitch angle data after the initial drive of the actuators is completed if the new moving average pitch angle data indicates to drive the actuators in a reverse direction.

5. A car head lamp auto-leveling system according to claims 1 or 2, wherein the drive of the actuators by the controlling means in the stable vehicle posture is executed based on the moving average pitch angle data, chosen based on a longest moving time, out of a plurality moving average pitch angle data in a plurality of different moving times.

6. A method for leveling a car headlamp comprising:

calculating moving average pitch angle data based on detected pitch angle data during a plurality of different predetermined moving intervals;

storing the moving average pitch angle data in a memory;

discriminating a stopped state from a moving state of a vehicle;

controlling the drive of an actuator to tilt the head lamp to a predetermined tilt state with respect to a road surface when the vehicle is stopped based on the moving average pitch angle data collected during a stable vehicle posture, the stable vehicle posture occurring when a state below a reference value is maintained for at least a predetermined time and is maintained after the difference between respective moving average pitch angle data during a plurality of different moving times is increased once to exceed the reference value; and controlling the drive of an actuator to tilt the head lamp to a predetermined tilt state with respect to a road surface when the vehicle is moving based on the moving average pitch angle data collected during a stable vehicle moving state, wherein the stable vehicle moving state is a state having a speed of more than a first predetermined value and an acceleration of less than a second predetermined value and which moving state continues and is maintained for a predetermined time, and wherein the pitch angle data used in the drive control of the actuators are two types of moving average pitch angle data that have different moving times, respectively.

* * * * *